United States Patent
Wong et al.

(10) Patent No.: US 9,660,432 B2
(45) Date of Patent: May 23, 2017

(54) SUBSEA UMBILICAL

(75) Inventors: Siu Kit Joe Wong, Newcastle Upon Tyne (GB); Alan Deighton, Sunderland (GB)

(73) Assignee: TECHNIP FRANCE (FR)

( * ) Notice: Subject to any disclaimer, the term of this patent is extended or adjusted under 35 U.S.C. 154(b) by 723 days.

(21) Appl. No.: 13/824,742

(22) PCT Filed: Sep. 30, 2010

(86) PCT No.: PCT/GB2010/051630
§ 371 (c)(1),
(2), (4) Date: May 9, 2013

(87) PCT Pub. No.: WO2012/042189
PCT Pub. Date: Apr. 5, 2012

(65) Prior Publication Data
US 2013/0220660 A1    Aug. 29, 2013

(51) Int. Cl.
*H02G 9/00* (2006.01)
*H01B 7/04* (2006.01)
*H01B 7/285* (2006.01)
*H01B 13/00* (2006.01)

(52) U.S. Cl.
CPC .............. *H02G 9/00* (2013.01); *H01B 7/046* (2013.01); *H01B 7/285* (2013.01); *H01B 13/0036* (2013.01)

(58) Field of Classification Search
USPC ........................................... 439/660; 174/68
See application file for complete search history.

(56) References Cited

U.S. PATENT DOCUMENTS

| 1,346,825 A * | 7/1920 | Hosford .................... C23C 2/38 |
|||118/420|
| 2,132,235 A * | 10/1938 | Green .................... H01B 7/226 |
|||174/119 C|
| 2,619,432 A * | 11/1952 | Hosmer .............. C04B 35/6365 |
|||220/2.3 R|

(Continued)

FOREIGN PATENT DOCUMENTS

| GB | 830 182 | 3/1960 |
| GB | 2 316 990 | 3/1998 |

(Continued)

OTHER PUBLICATIONS

International Preliminary Report on Patentability dated Apr. 2, 2013 issued in corresponding International Application No. PCT/GB2010/051630.

(Continued)

*Primary Examiner* — William H Mayo, III
*Assistant Examiner* — Krystal Robinson
(74) *Attorney, Agent, or Firm* — Ostrolenk Faber LLP

(57) ABSTRACT

An umbilical for use in the offshore production of hydrocarbons, the umbilical comprising at least one electric cable, the electric cable comprising at least one electric conductor (18), and at least one electric conductor (18) comprising plurality of electric strands having interstices (15), wherein the interstices are filled with a metal-based material. In this way, there is provided an umbilical with a 'void-free1 or completely gap-filled conductor construction which therefore prevents water or gas migration or transport along such a conductor.

13 Claims, 3 Drawing Sheets

(56) References Cited

U.S. PATENT DOCUMENTS

| | | | | |
|---|---|---|---|---|
| 3,428,926 | A * | 2/1969 | Bogner | C25D 3/42 |
| | | | | 174/110 R |
| 3,429,032 | A * | 2/1969 | Benz | C22C 1/045 |
| | | | | 257/E39.001 |
| 3,527,873 | A * | 9/1970 | Brechna | H01B 12/12 |
| | | | | 174/125.1 |
| 6,472,614 | B1 | 10/2002 | Dupont et al. | |
| 7,285,726 | B2 * | 10/2007 | Bremnes | F16L 53/007 |
| | | | | 174/102 C |

FOREIGN PATENT DOCUMENTS

| | | |
|---|---|---|
| WO | WO 93/17176 | 9/1993 |
| WO | WO 2005/124213 | 12/2005 |
| WO | WO 2008/032019 A2 | 3/2008 |
| WO | WO 2009/064559 | 5/2009 |

OTHER PUBLICATIONS

"Wire Wisdom", Anixter, Inc., Wire & Cable Group, File: C-7 (2007).

"Specification for Subsea Umbilicals", API Specification 17E/ISO 13628-5, Third Edition (2003).

International Search Report dated May 3, 2011 issued in corresponding International patent application No. PCT/GB2010/051630.

\* cited by examiner

SUBSEA UMBILICAL

CROSS REFERENCE TO RELATED APPLICATIONS

The present application is a 35 U.S.C. §371 National Phase conversion of PCT/GB2010/051630, filed Sep. 30, 2010, the disclosure of which is incorporated herein by reference. The PCT International Application was published in the English language.

TECHNICAL FIELD OF THE INVENTION

The invention relates to an umbilical for use in the offshore production of hydrocarbons, and particularly to an umbilical comprising electrical cables.

BACKGROUND OF THE INVENTION

An umbilical comprises a group of one or more types of elongated functional elements such as electric cables, optical fibre cables, or hoses for fluid transportation of, for example, gas, water or chemical products such as methanol. The functional elements can be assembled together in a helical or S/Z manner and over-sheathed and/or over-armoured for mechanical strength and ballast.

It is desirable for a single umbilical to be able to contain as many functional elements as are required for a particular application, for example, as are required for a particular oil field where the umbilical is intended for use. Umbilicals are typically used for transmitting power, signals and fluids (for example for fluid injection, hydraulic power, gas release, etc.) to and from a subsea installation.

API Specification 17E/ISO 13628-5 "Specification for Subsea Umbilicals" provides standards for the design and manufacture of such umbilicals.

Subsea umbilicals are installed at increasing water depths, commonly deeper than 2000 m. Such umbilicals have to be able to withstand severe loading conditions during their installation and their service life.

The main load bearing components in charge of withstanding the axial loads due to the weight and to the movements of the umbilical are steels tubes (see U.S. Pat. No. 6,472,614, WO93/17176 and GB2316990), steel rods (see U.S. Pat. No. 6,472,614), composite rods (see WO2005/124213), or tensile armour layers (see FIG. 1 of U.S. Pat. No. 6,472,614).

The other elements, i.e. the electrical and optical cables, the thermoplastic hoses, the polymeric external sheath and the polymeric filler components do not contribute significantly to the tensile strength of the umbilical.

Electrical cables used in subsea umbilicals fall into two distinct categories respectively known as power cables and signal cables.

Power cables are used for transmitting high electrical power (typically a few MW) to powerful subsea equipments such as pumps. Power cables are generally rated at a medium voltage comprised between 6 kV and 35 kV. A typical power cable is illustrated in the accompanying FIG. 1. From inside outside, it comprises a central copper conductor $2a$, semi-conductor and electrical insulation layers $2b$, a metallic foil screen $2c$ and an external polymeric sheath $2d$. The central conductor $2a$ has generally a stranded construction and a large section typically comprised between 50 mm2 and 400 $mm^2$. Three phase power is provided by three such cables bundled together within the umbilical structure.

Signal cables are generally used for transmitting signals and low power (<1 kW) to electrical devices on the seabed. Signal cables are generally rated at a voltage smaller than 3000V, and typically smaller than 1000V. Signal cables generally consist of small section insulated conductors bundled together as pairs (2), quads (4) or, very rarely, any other number, said bundle being further over-sheathed. An example of quad signal cable is illustrated in the accompanying FIG. 2. Four small size stranded copper conductors $3a$ are individually over sheathed by polymeric insulation layers $3b$ and helically bundled together. A polymeric filler material $3c$ is added to fill the voids in the bundle and achieve a cylindrical shape. This arrangement is optionally surrounded by an electromagnetic shielding $3g$ made from a wrapped copper or aluminium foil. A polymeric external sheath $3d$ protects the cable against mechanical damage and water ingress.

A problem with known electric cables is the presence and migration of water and gas along the electrical cable conductor. Water and gas can permeate through polymer sheaths and insulation layers and then migrate along the cable conductor to subsea terminations and potentially lead to premature failure. Gas can also migrate to the topside junction boxes potentially creating hazards if not vented away.

In particular, hydrogen formation can occur where there are components comprising zinc within the umbilical, for example zinc coated steel armours. If hydrogen forms within the umbilical, then the hydrogen gas will try to find a way to exit the umbilical. Sometimes it finds a way through the external sheath of the umbilical. However, it has also been observed the hydrogen could permeate through the electrical cables' outer sheath and insulation layers to reach the electrical conductors and then propagate along the conductors towards the end of the umbilical. At the end of the umbilical, the hydrogen typically may become backed-up and may begin to build pressure (if the termination is not vented). This may lead to an explosion and/or a loss of electrical insulation (short circuit).

WO2008/032019 describes adding a tubular metallic layer between the insulation layer and the external sheath of the electrical cables, in order to prevent water and gas permeation. However, delicacy is needed to implement such a tubular metallic screen which needs both to be impermeable enough to hydrogen (small size molecules) and flexible enough to withstand bending loads.

WO2008/032019 also describes filling the voids/interstices between the strands of the conductor with a hydrogen absorbent material. However, this has a service life issue: when this material has fully reacted with hydrogen, the protection does not work anymore, although it can be used in combination with the tubular metallic screen to reduce as much as possible the amount of hydrogen to neutralize.

WO2009/064559 describes monitoring the hydrogen migration along the cables and relieving pressure when it reaches a predetermined amount (page 3, end of §[0005]). However, this is not fully reliable, and is difficult to implement on subsea terminations.

U.S. Pat. No. 7,285,726 describes a subsea power cable comprising a stranded copper conductor. The voids between the strands are filled with a hydrophobic water-blocking compound in order to prevent longitudinal water penetration and facilitate repair (col. 3, lines 20-23). However, this can lead to manufacturing problems as the jelly compound may gas out during the insulation extrusion process.

One object of the present invention is to minimise or overcome these problems.

SUMMARY OF THE INVENTION

According to one aspect of the present invention, there is provided an umbilical for use in the offshore production of hydrocarbons, the umbilical comprising at least one electric cable, the electric cable comprising at least one electric conductor, and at least one electric conductor comprising a plurality of electric strands having interstices, wherein the interstices are filled with a metal-based material.

In this way, there is provided an umbilical with a 'void-free' or completely gap-filled conductor construction which therefore prevents water or gas migration or transport along such a conductor, more particularly into a subsea connector or a top side junction box.

Umbilicals for use in the offshore production of hydrocarbons generally comprise a plurality of functional elements contained within an outer sheath. For the present invention, at least one of said functional elements is an electric cable. Electric cables can be used for the transmission of power or signals or both, and can be categorised into having a high, medium or low power rating, especially when being a power cable.

The electric cable in the umbilical of the present invention comprises at least one electric conductor. The or each electric conductor is a stranded electric conductor comprising a plurality of electric strands, generally in the form of a 'bundle'. In the present application, the terms "strand" and "wire" have the same meaning, a stranded conductor being an assembly of wires or strands twisted together. An electric stranded conductor may comprise a plurality of electric strands of different size, designs, material, shape, etc. although commonly it is desired to use a number of similar strands when forming an electric conductor.

Methods of assembly or otherwise bringing together a number of electric strands together are well known in the art, and include forming them in a helical or S/Z manner. Such methods are not further discussed herein.

In the bringing together of such strands, interstices are formed between the abutting outer surfaces of the strands. In another way, the abutting outer surfaces of the electric strands define the interstices. The number, nature, design, size or arrangement of the interstices can vary depending upon the number, nature, design, size, or arrangement of the electric strands.

The electric strands may be formed of any suitable material, generally being copper, optionally one or more other metals such as aluminium, and optionally a combination of metals including alloys.

Preferably, the metal-based material is the same material as the outer surface of the electric strands.

According to one embodiment of the present invention, the electric strands are metal-coated metal wires. Metal coatings are commonly applied to the surface of individual wire strands and electrical conductors for various purposes, including to improve solderability and reduce oxidation (corrosion). Some of the most common coating materials used with copper conductors are tin, silver, zinc, cadmium and nickel, in particular tin. Tin is the most common coating material. The metal wires may be coated with more than one coat layer and/or more than one metal, including alloys.

Thus, according to another embodiment of the present invention, the electric strands are tin-coated copper wires or tin-coated aluminium wires.

Conductors coated with tin are sometimes referred to as "tin plated" or simply as "tinned" conductors. Tin effectively prevents oxidation at temperatures up to about 150° C. Methods of coating metal wires are well known in the art, including hot dipping and electroplating. Generally, the coating is relatively thin compared to the remainder of the metal wire.

According to another embodiment of the present invention, the metal-based material is the same material as the coating of the metal wires forming such electric strands.

The metal-based material may be any suitable single metal, combination of metals or alloys, including but not limited to copper, tin, aluminum, copper+tin, aluminum+tin, etc.

According to one particular embodiment of the present invention, the electric strands are tin-coated copper wires, and the metal-based material is tin.

The application of the metal-based material into the interstices between the electric strands may be carried out in a number of methods. This includes passing the electric strands through a bath, preferably a molten bath, of the metal-based material, as discussed in more detail herein below. This also includes location the metal-based material within the electric strands as they are being brought together to form the electric conductor. This also includes pressure filling the interstices with the metal-based material, optionally with applied heat.

According to another embodiment of the present invention, the electric strands also have non-interstitial surfaces, and the non-interstitial surfaces are coated with the metal-based material. That is, those surfaces of the electric strands not forming the interstices, generally being the outer facing surfaces of the electric strands once assembled together to form the conductor.

Preferably, the electric conductor in the umbilical of the present invention is a fused bundle, wherein the metal-based material is fused with the metal material of the metal-coating of the metal wires. The fusing may be part of or the way of filing of the interstices with the metal-based material, optionally assisted with one or more pre-bonding or post-bonding processes.

According to a particular embodiment of the present invention, the electric conductor is or has the same form as a Tin Over Coated Tinned Annealed Stranded Copper Wire conductor (often abbreviated to "TASC conductor"). Such over-coated conductors are manufactured from tinned copper strands which are twisted together before being passed through a molten bath of tin. The tin from the molten bath melts and fuses with the tin coatings of the individual stands, thus filling the interstices between the strands.

TASC conductors are known within the electronic industry for automated rapid terminations into printed circuit boards by pressure welding. However, to the inventors' knowledge, such conductors have never been used in subsea umbilicals.

According to another embodiment of the present invention, the electronic conductor further comprises an outer insulation layer to provide insulation of or to the conductor, optionally after compaction of the interstices-filled electric conductor.

According to a second aspect of the present invention, there is provided an umbilical as defined herein comprising at least the steps of:

(a) bringing together electric strands to form an electric conductor and the interstices thereinbetween;
(b) filling the interstices with a metal-based material; and
(c) using the filled electric conductor of step (b) in the manufacture of an umbilical.

The forming of an electric conductor by bringing together or otherwise assembling electric strands is known in the art, and it is also known to form or otherwise define the interstices between the abutting surfaces of the electric strands.

The interstices are filled with a metal-based material. The filling can be carried out using a number of methods known in the art, generally involving the heating of either the electric strands, the metal-based material, or both, so as to increase the fusion and/or infusion of the metal-based material into the interstices.

Step (a) and step (b) can occur concurrently or sequentially. For example, the metal-based material may be provided to the electric strands as they are being stranded in step (a), optionally with the application of heat to assist the fusing of the metal-based material with the outer surfaces of the electric strands to completely fill the interstices between formed between the electric strands.

According to one embodiment of the present invention, the filling step (b) comprises passing the electric strands through a bath of the metal-based material, more preferably a molten bath.

Alternatively, the interstices are filled in a pre-bonded process, wherein the electric strands are heated to the melting point of their outer surfaces prior to, during and/or after they are stranded, effectively soldering the outer surfaces together continuously along their length.

Preferably, the method of the present invention includes melting the outer surfaces of the electric strands, preferably with a metal-based material during step (b), such that the material of the outer surfaces of the electric strands flow into the interstices and the interstices are completely filled. Where the electric strands have a metal coating, such as tin, and where the metal-based material of the same material, such as tin, the flow of metal-based material around and into the electric conductor to replenish the coating material filling the interstices is an easy manufacturing process, leading to the complete filling of the interstices such that they are then void-free.

Optionally, the method of the present invention further comprises compacting the electric conductor of step (b), generally prior to step (c).

Further optionally, the method of the present invention further comprises adding an insulation layer around the electric conductor of step (b). Preferably, the insulation layer is added using pressure extruding to avoid or otherwise minimise the creation of any voids at the interface between the electric conductor and the insulation layer.

BRIEF DESCRIPTION OF THE DRAWINGS

Preferred embodiments of the present invention will now be described, by way of example only, and with reference to the accompanying drawings, in which.

DESCRIPTION OF PREFERRED EMBODIMENTS

Figure 1:
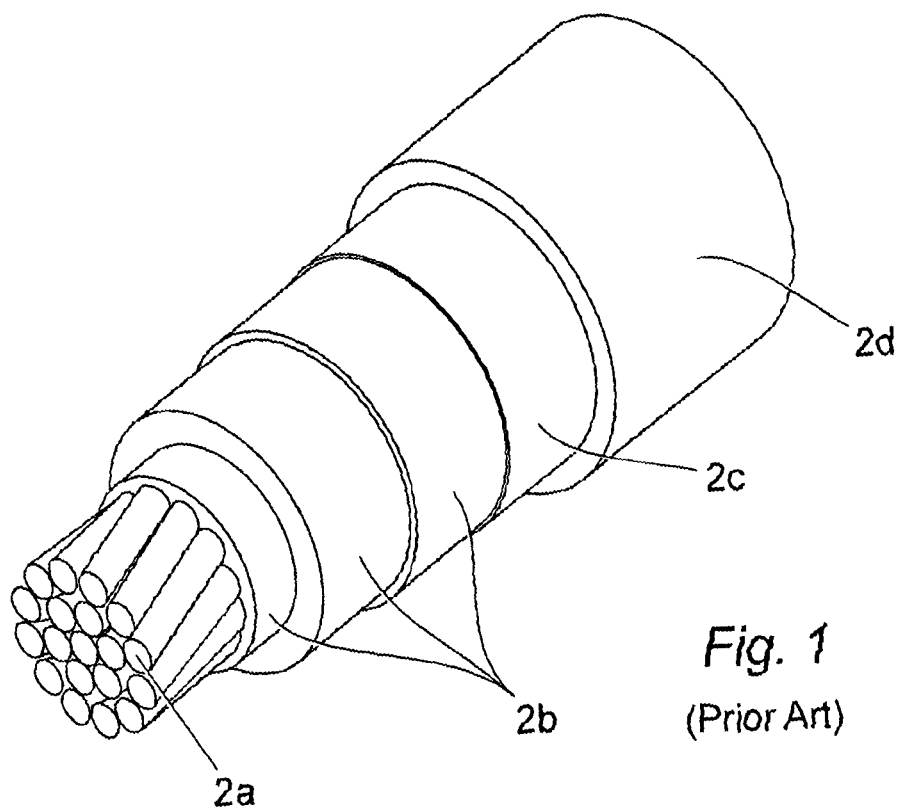
FIG. 1 is a perspective cross-section of a first prior art power cable for use in a subsea umbilical.
Figure 2:
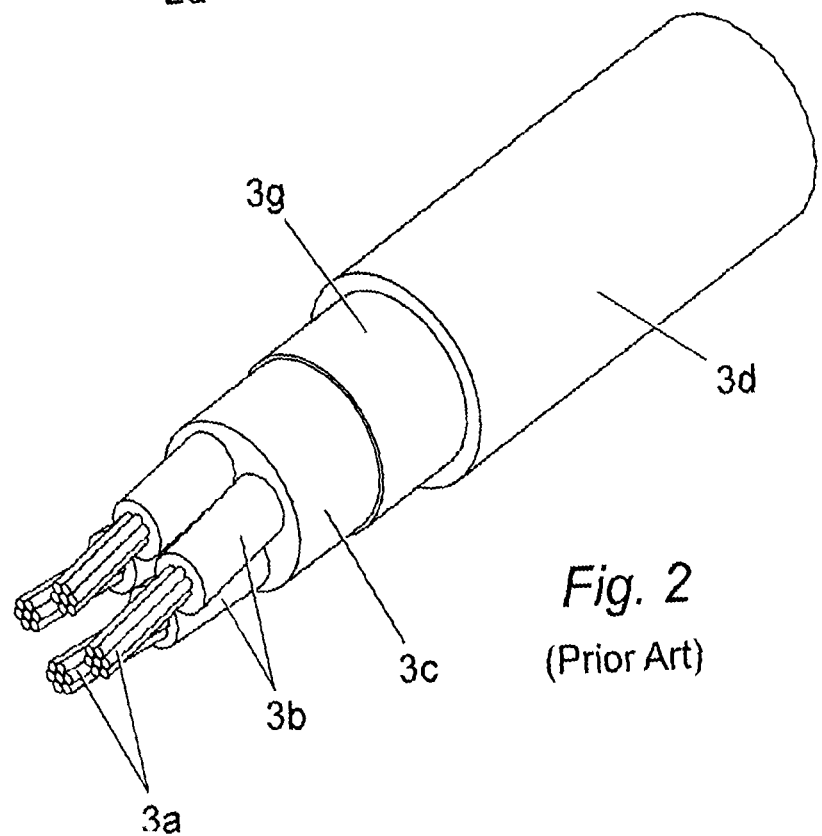
FIG. 2 is a perspective cross-section of a second prior art signal cable for use in a subsea umbilical.

Referring to the drawings, FIGS. 1 and 2 show respectively a typical prior art power cable and a typical prior art signal cable as already described herein, having either a central copper conductor 2a or four individually sheathed copper conductors 3a respectively.

Figure 3:
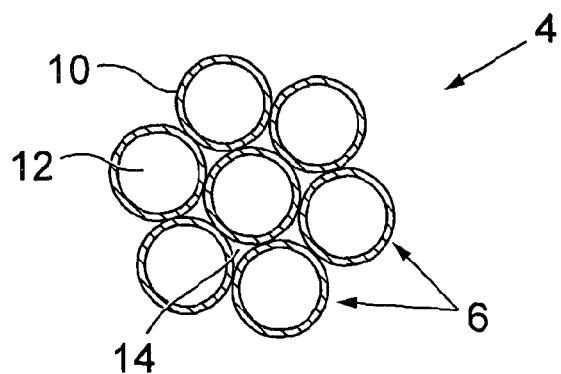
FIG. 3 is a cross-section of an electric conductor in preparation for use in an umbilical according to a first embodiment of the present invention.

FIG. 3 shows a cross-section of an electric conductor 4 comprising seven electric strands 6. Each electric strand 6 comprises a core 12, generally formed of copper or possibly aluminium, surrounded by an annular individual coating of a metal material 10, generally being tin.

The relative dimensions of the coating 10 and core 12 shown in FIG. 3 are for illustration purposes only and are not limiting. For example, the diameter of the core 12 is typically between 0.5 mm and 5 mm depending on the type, nature, cross-section, etc. of the conductor (prior to any insulation layer).

In this regard, signal cable conductors and low voltage conductors generally comprise seven stands, with the core diameter of each strand typically being between 0.67 mm and 2.14 mm, to give a conductor cross-section between 2.5 $mm^2$ and 25 $mm^2$.

Meanwhile, power cable conductors generally comprise more strands, such as between nineteen to sixty-one strands, depending on their cross-section, with the core diameter of each stand typically being between 1.78 mm and 3.14 mm, to give a conductor cross-section between 50 $mm^2$ and 400 $mm^2$.

The thickness of a strand metal coating, such as the coating 10 in FIG. 3, around each strand is typically between 0.5 and 10 micrometers, preferably between 1 and 2.5 micrometers.

The assembling of the electric strands 6 creates six interstices 14 between the abutting surfaces or portions of the electric strands 6. These interstices are voids in the conductor, along which water and gas (which could enter the conductor by permeating through any outer sheaths and insulation layers) can migrate along the conductor to subsea terminations and potentially lead to premature failure of the electric cable and umbilical. Moreover, the voids provide easy migration of any gas created or passing into the conductor.

Figure 4:
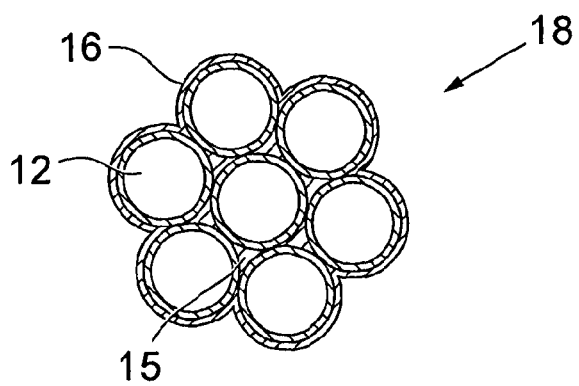
FIG. 4 is a cross-section of the electric conductor of FIG. 3 after filling the interstices.

According to one method of the present invention, and progressing towards FIG. 4, the electric conductor 4 shown in FIG. 3 can be passed through a bath of molten metal-based material such as tin, with the result that the tin from the molten bath is applied around the outside of the electric strands 6. Based on the raised temperature of the molten bath, and optionally any pre-heating of the electric conductor 4, the tin from the molten bath melts and fuses with the tin coatings 10, which then flows inwardly to fill the interstices 14 between the electric strands 6. This provides filled interstices 15, with the resulting filled electric conductor 18 shown in FIG. 4 as a now fused bundle of electric strands.

FIG. 4 also shows tin from the molten bath providing a coating 16 around the outer or non-interstitial surfaces of the electric strands 6, i.e. around the outside of the electric strands 6. In this way, all of the filled electric conductor 18 is overcoated with tin.

The thickness of a conductor over-coating, such as the coating 16 shown in FIG. 4, is typically between 0.5 and 200 micrometers, preferably between 1 and 10 micrometers.

Optionally, the filled electric conductor 18 shown in FIG. 4 is compacted following the application of the tin overcoat 16. Further optionally, the electric conductor is smoothed to provide a smooth outer conductor shape.

Figure 5:
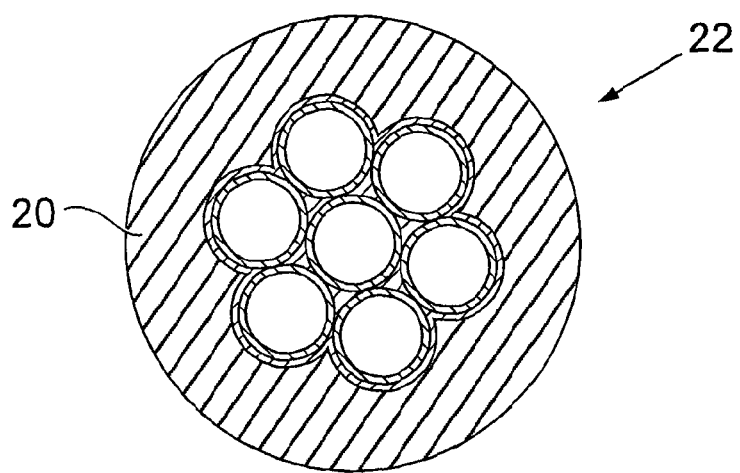
FIG. 5 is a cross-section of the electric conductor of FIG. 4 after providing an outer insulation layer around the electric conductor.

FIG. 5 shows the filled electric conductor 18 of FIG. 4 provided with an insulation layer 20 to form an insulated electric conductor 22. Preferably, the insulation 20 is provided in a pressure extrusion process in order to minimise, preferably avoid, the creation of any voids at the interface between the electric conductor 18 and the insulation layer 20, and to provide a smooth outer surface, in particular a 'rounded' conductor readily useable in a further manufacturing process.

Figure 6:
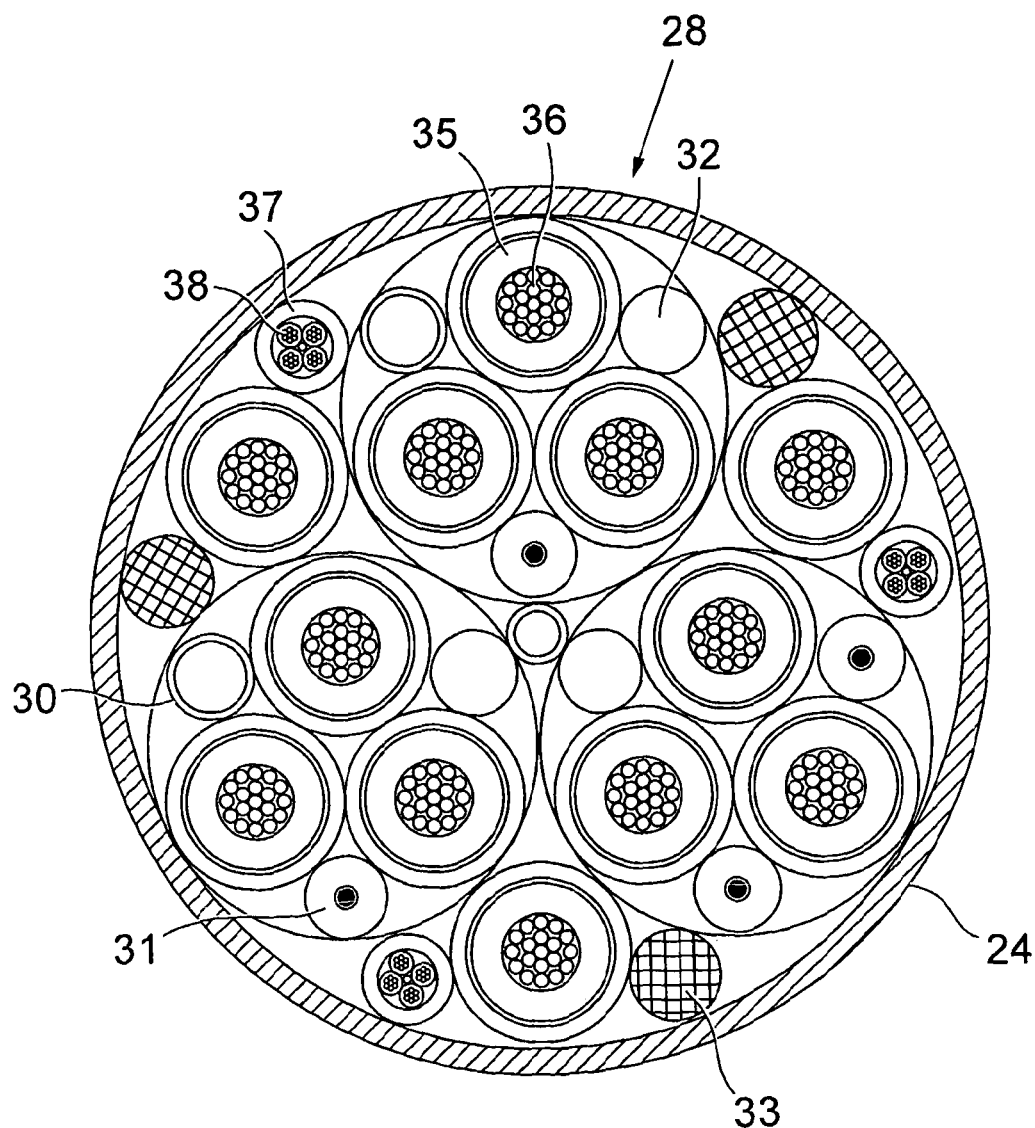
FIG. 6 is a cross-section of a subsea umbilical according to an embodiment of the present invention.

The insulated electric conductor 22 of FIG. 5, and optionally the electric conductor 18 of FIG. 4, are now ready for use in forming an electric cable for an umbilical for use in the offshore production of hydrocarbons. Such a cable may comprise a number of separate electric conductors such as shown in FIG. 2, optionally individually sheathed, or as a single core cable as shown in FIG. 1. The umbilical may comprise one or more such cables, being the same or different, optionally with one or more other electric cables, and generally with one or more functional elements as described hereinbefore FIG. 6 shows an umbilical 28 according to the present invention, said umbilical comprising electric cables being power cables 35 having a power conductor 36, and signal cables 37 having signal conductors 38, steel tubes 30, optical fibre cables 31, steel or composite rods 32 and polymeric fillers 33, bundled together and over-sheathed by a polymeric external sheath 34.

According to the present invention, at least one of the conductors 36, 38 of at least one of the electric cables 35, 37 comprises a plurality of electric strands having interstices filled a metal-based material.

For example, according to a first example of the invention, all the stranded conductors 36,38 of all the electric cables 35,37 of the umbilical are TASC conductors.

According to a second example of the invention, only the signal cables 37 have TASC conductors 38. Commonly, power cables 35 are generally better protected than signal cables 37 against water and gas permeation because of their thicker insulation layer and metallic foil electrostatic screen.

According to a third example of the invention, only the power cables 35 have TASC conductors 36.

According to a fourth example of the invention, the stranded conductor 36 of at least one of the power cables 35 comprises aluminium or aluminium matrix composites strands having interstices, said interstices being filled with a metal-based material, such as tin for example. Examples of suitable aluminium matrix composites are disclosed by U.S. Pat. No. 6,180,232. Replacing copper strands by aluminium and/or aluminium matrix composites strands reduces significantly the suspended weight of deep water power umbilicals.

The purpose of the present invention is to use a conductor without any voids for a cable within a subsea umbilical. Voids in a conductor allow water and gas to enter the conductor by permeating through the cables polymer outer sheath and insulation layers. Water and gas can then migrate along the conductor to subsea terminations and potentially lead to premature failure. Gas can also migrate to topside junction boxes potentially creating hazards if not vented off. Ideally a solid conductor would be used so to eliminate voids within the conductor. However a solid conductor has poor flexibility and will be prone to fatigue damage during umbilical installation and for dynamic umbilicals in-service.

U.S. Pat. No. 7,285,726 describes a subsea power cable having a conductor consisting of stranded copper wires, wherein the gaps in the conductor are filled with a hydrophobic water-blocking compound. Whilst this could eliminate such gaps, this is not easily applied to conductors with small wire sizes and hence small voids, which a typically used in subsea umbilicals. Moreover, water-blocking compounds such as jellies can lead to manufacturing problems as they can gas out during any addition of insulation around the conductor.

In the present invention, the interstices formed between the electric strands as they are assembled together are filled with a metal-based material which can be more easily added, especially to small wire sizes (for example having a diameter <1 mm), and does not lead to any subsequent manufacturing problems.

Furthermore, in the event of a cable being damaged subsea and cut for a repair, water will be prevented from flowing between the conductor strands along the length of the cable, which could potentially corrode the copper wires.

Various modifications and variations to the described embodiments of the inventions will be apparent to those skilled in the art without departing from the scope of the invention as defined in the appended claims. Although the invention has been described in connection with specific preferred embodiments, it should be understood that the invention as claimed should not be unduly limited to such specific embodiments.

What is claimed is:

1. An umbilical for use in the offshore production of hydrocarbons, the umbilical comprising at least one electric cable, the electric cable comprising at least one electric conductor, and the at least one electric conductor consisting of a plurality of electric strands having interstices that are filled with a metal-based material,
    wherein the electric strands are tin-coated copper wires or tin-coated aluminum wires, and
    wherein the metal-based material is tin.

2. An umbilical as claimed in claim 1, wherein the metal-based material is fused with the metal-coating of the metal wires.

3. An umbilical as claimed in claim 1, wherein the electric conductor is a TASC conductor.

4. An umbilical as claimed in claim 1, wherein the electric strands also have non-interstitial surfaces, and the non-interstitial surfaces are coated with the metal-based material.

5. An umbilical as claimed in claim 1, further comprising an outer insulation layer over the at least one electric conductor.

6. A method of forming an umbilical as claimed in claim 1, comprising at least the steps of:
    (a) bringing together electric strands to form an electric conductor and the interstices thereinbetween;
    (b) filling the interstices with a metal-based material; and
    (c) using the filled electric conductor of step (b) in the manufacture of an umbilical,
    wherein the electric strands are tin-coated copper wires or tin-coated aluminum wires, and
    wherein the metal-based material is tin.

7. A method as claimed in claim 6, wherein step (a) and step (b) occur concurrently or sequentially.

8. A method as claimed in claim 6, wherein the filling of step (b) comprising passing the electric strands through a bath of the metal-based material.

9. A method as claimed in claim 6, comprising melting the outer surfaces of the electric strands with the metal-based material during step (b).

10. A method as claimed in claim 6, further comprising compacting the electric conductor of step (b).

11. A method as claimed in claim 6, wherein the electric conductor of step (b) is a TASC conductor.

12. A method as claimed in claim 6, further comprising adding an insulation layer around the electric conductor of step (b).

13. A method as claimed in claim 12, comprising pressure extruding an insulation layer around the electric conductor of step (b).

\* \* \* \* \*